United States Patent
Hess et al.

[15] 3,652,405
[45] Mar. 28, 1972

[54] SEWAGE AND MUNICIPAL REFUSE LIQUID PHASE COKING PROCESS

[72] Inventors: Howard V. Hess, Glenham; Raymond F. Wilson; Edward L. Cole, both of Fishkill, all of N.Y.

[73] Assignee: Texaco Inc., New York, N.Y.

[22] Filed: June 15, 1970

[21] Appl. No.: 46,059

[52] U.S. Cl. ................................210/10, 110/8, 210/71
[51] Int. Cl. ...........................................C02c 3/00
[58] Field of Search ..................71/12–14; 210/10, 210/65–68, 71, 152; 110/8

[56] References Cited

UNITED STATES PATENTS

| | | | |
|---|---|---|---|
| 3,383,228 | 5/1968 | Rekate et al. | 110/8 X |
| 3,549,011 | 12/1970 | Marsh | 210/71 |
| 3,549,529 | 12/1970 | Wiseman | 210/71 X |
| 3,592,449 | 7/1971 | Hess et al. | 210/71 X |
| 3,507,788 | 4/1970 | Cole et al. | 210/71 X |
| 3,549,010 | 12/1970 | Marsh et al. | 210/73 X |
| 2,246,224 | 6/1941 | Streander | 210/152 |
| 1,102,532 | 7/1914 | Matlack | 71/14 X |
| 3,357,812 | 12/1967 | Snell | 71/14 |
| 3,533,775 | 10/1970 | Brown | 71/13 X |

Primary Examiner—Reuben Friedman
Assistant Examiner—Thomas G. Wyse
Attorney—Thomas H. Whaley and Carl G. Reis

[57] ABSTRACT

A combination process for treating both municipal refuse and sewage includes the steps of shredding the solid refuse and mixing the shredded material thus obtained with a recycle stream of water resulting from a subsequent coking step to form a slurry; removing noncombustible materials from this slurry; mixing the slurry with sewage sludge and coking the resulting mixture under a pressure sufficient to prevent the vaporization of water, thereby producing grease, clean water and clean coke.

6 Claims, 1 Drawing Figure

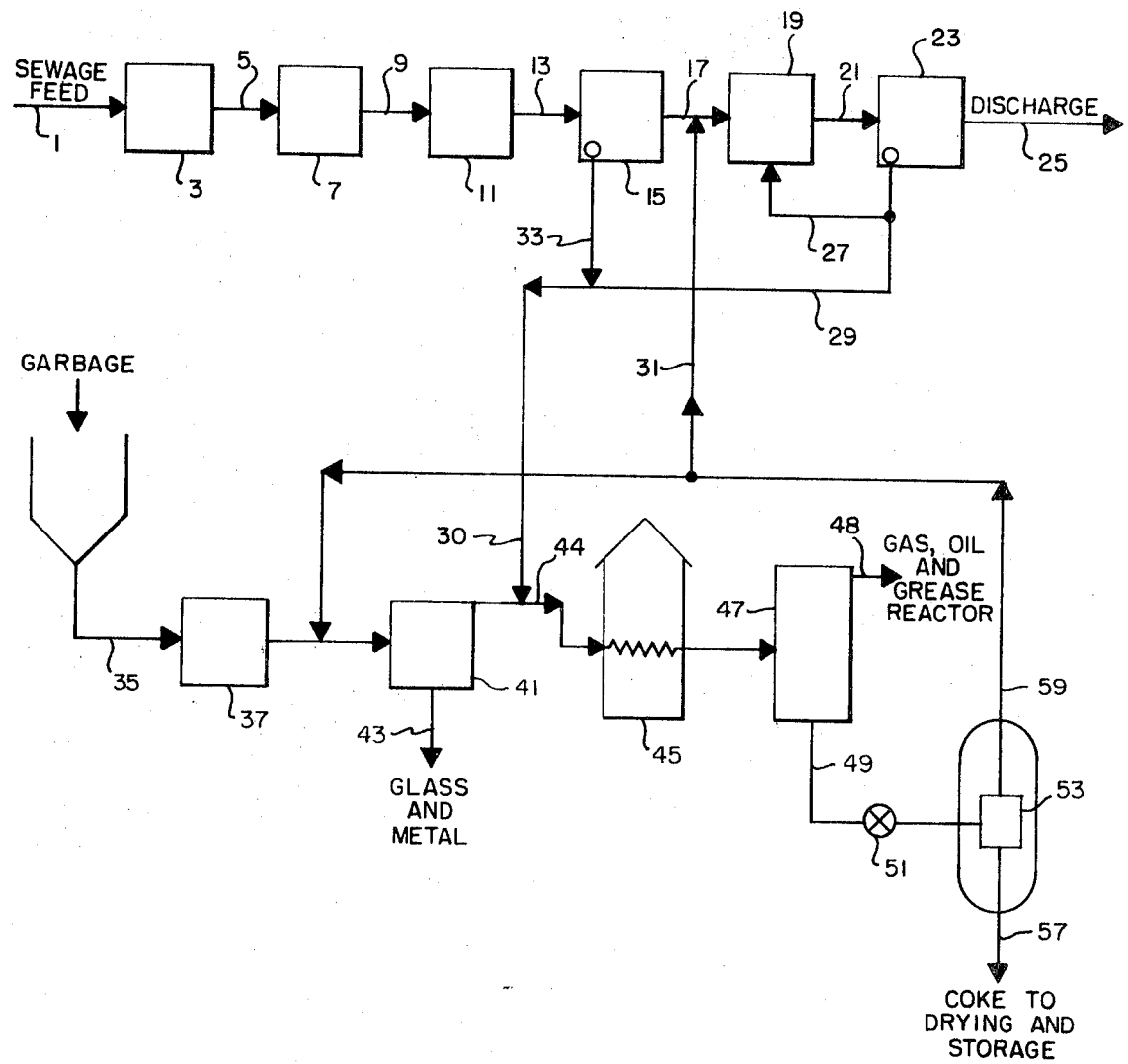

SEWAGE AND MUNICIPAL REFUSE LIQUID PHASE COKING PROCESS

BACKGROUND OF THE INVENTION

This invention relates to a process for purifying both raw sewage and refuse of domestic and industrial origin.

At the present time the disposal of sewage and garbage involves two separate and unrelated techniques. Sewage is generally treated by a sequence of steps whereby sludges are separated from a clear water phase and the sludges are disposed of by incineration, burial or dumping at sea. In a newer process sewage is coked under specific conditions to give a clean effluent and a sterile coke. Municipal waste, on the other hand, is collected and burned with or without an attempt to salvage constituents thereof. In general, it has been the belief of those skilled in this art that these two types of disposal treatments were incompatible owing mainly to the different nature of their constituents.

SUMMARY OF THE INVENTION

In accordance with the present invention it has been discovered that it is possible to purify both raw sewage and municipal refuse with the following advantageous results: the resulting process lends itself to automation and has low investment and operating costs; both sewage sludge and solid refuse can be converted to commercially valuable products; the water effluent which is obtained is low in chemical and biological oxygen demand as well as in solids content; and valuable metals in the refuse can be easily salvaged therefrom.

The process of the invention whereby the foregoing advantageous results are obtained comprises the steps of: shredding solid refuse from which hard to reduce or large particulates have previously been removed; slurring the shredded material with a recycle stream of water resulting from a subsequent coking step; removing noncombustible materials from the resulting slurry; mixing the slurry with sewage sludge; and coking the resulting mixture under a pressure sufficient to prevent the vaporization of water thereby producing grease, clean water and clean coke.

In the present process, sewage from a municipal sewer system is screened and freed of large objects and grit. It is then caused to flow to a primary settler where the settleable sludge is removed, the waste water free of settleable solids being sent to an activated sludge chamber where an activated sludge is formed, settled and removed. The sludges from the primary settler and from the activated sludge settler are mixed and pumped to a tubular coking reactor.

As regards the incoming municipal refuse, it is shredded and if necessary with enough recycle water to provide a low viscosity slurry which is processed in a gravity settler. Generally from 4 to 50 parts by weight of water per part of waste should be used, with the preferred range being from 6 to 1 to 25 to 1. The lighter combustible organic particulates float and are withdrawn from the top of the settler, mixed with the sewage sludge and coked therewith. The other heavier particulate materials comprising metal, sand, pebbles, ceramic and glass sink to the bottom of the settler from which they can be withdrawn. Carbon dioxide or air can be injected to improve the separation of heavier materials by facilitating flotation of the organic particulates.

Coking of the sludge with the combustible refuse preferably is achieved in a tubular reactor at a temperature of about 400° to about 750°, with the preferred range being from 550° to 650° F. The pressure generally ranges from 250 to 2400 p.s.i.g.

Further details of the present process will become more readily apparent from the following description taken together with the accompanying drawing, the single figure of which is a schematic view illustrating in non-limiting fashion a practical embodiment of the invention.

DETAILED DESCRIPTION OF THE INVENTION

Referring to the FIG., it will be seen that the raw sewage from a domestic and/or industrial sewage system is discharged from conduit 1 to a bar screen device 3 and passed through conduits 5 and 9, respectively, into and through comminutor 7 and grit chamber 11 to remove large objects and grit therefrom. The sewage then passes through conduit 13 into primary settler 15 where the primary sludge is removed through conduit 33. The waste water now substantially free of solid sewage is sent to an activated sludge treating chamber 19 via conduit 17. Further removal of sludge takes place in final settler 23 to which the water sludge accedes through conduit 21. Settler 23 serves to remove the activated sludge. The water having a low BOD is discharged through conduit 25 to a receiving body of water. Conduit 27 is a recycle line for activated sludge. It is important that a large volume of vigorous activated sludge be maintained in vessel 19. This is partially achieved by recycling a portion of the activated sludges. The excess activated sludge from vessel 23 representing that portion of the activated sludge not recycled to vessel 19 is combined with the sludge from primary settler 15 and the two sludges are mixed in line 30 and pumped to the tubular coking reactor 45.

The incoming municipal waste is delivered by trucks and placed on conveyor line 35 to be shredded in grinder 37. The shredded garbage is advantageously mixed with a recycle water stream from conduit 59 sufficient to provide a low viscosity slurry that can be processed in the gravity settler 41. The slurry enters the settler near the midpoint and the heavier materials such as silt, glass, and metal particles sink to the bottom to be withdrawn through outlet 43 while the lighter combustible particulate materials float to the top. The combustible municipal refuse is withdrawn from the top of the settler through conduit 44, mixed with the sewage sludge from conduit 30 and sent to the tube reactor 45. In the tube reactor coking occurs at a high temperature and a pressure sufficient to prevent vaporization of the water. The effluent from the coil is passed to the settler-reactor 47 where the reactions are completed and the gas, oil, and grease are separated from the water-coke slurry through conduit 48. The slurry is sent via conduit 49 and pressure reduced to a separator 53 where the coke is separated from the water. The separator may be a filter device or a cyclone or a hydrocyclone. The water from the separator, having a reduced BOD relative to the charge is discharged through conduit 59. A portion of this water is recycled to provide a workable slurry in vessel 41 while the excess water is directed to the activated sludge treating vessel 19 via lines 31 and 17 to achieve a further reduction in BOD.

DESCRIPTION OF SPECIFIC EMBODIMENTS

The following example is given to illustrate the present process and to illustrate the outstanding effectiveness thereof in treating sewage and municipal refuse to produce purified water and useful products. It is not, however, intended to limit the present process to the particular operating conditions described, or the particular concentrations of constituents in the charged materials.

The example shows how the disclosed process can be used to treat the sewage and municipal refuse for a city with a population of 30,000.

The sewage from the septic sewers has typically 99.95 percent water and 0.05 percent solids, a BOD of 150–200 and a COD of generally greater than 200. A typical analysis of the sludge from the primary settler is as follows:

| | |
|---|---|
| Solids, % | 5.0 |
| COD, mg O/L | 60,000 |
| Residue on Evap., mg/L | 50,000 |
| Total Volatile, mg/L | 33,300 |
| Final Residue, mg/L | 16,700 |

For this city, the total sewage sludge averages 30.0 tons per day.

The municipal refuse for this city had the following typical analysis on a dry basis:

| Constituent | Wt. % Dry Constituent Basis* | |
|---|---|---|
| | With metal and glass | Without metal and glass |
| Paper | 41.0 | 48.4 |
| Yard Trimmings | 11.1 | 13.1 |
| Wood | 7.1 | 8.4 |
| Rags | 2.8 | 3.3 |
| Rubber | 4.1 | 4.8 |
| Plastic | 0.3 | 0.4 |
| Garbage | 1.2 | 1.4 |
| Metal | 6.8 | 0 |
| Glass | 8.5 | 0 |
| Moisture | 17.1 | 20.2 |
| Total | 100.0 | 100.0 |

*All water accounted for as % moisture

The total daily refuse production averages 75 tons per day.

The incoming refuse is dumped by truck into a hopper from which the refuse is continuously removed onto a conveyor belt. While on the belt large inorganic particulates such as iron rods, automobile radiators, large stones, gallon bottles, etc. are removed and segregated by hand before being shredded in a hammermill type comminutor. Recycle water amounting to 1014 tons per day is added to the shredded refuse and this mixture is pumped to the settler where 11.5 tons of glass and metal are removed daily. The glass and metal free refuse slurry (totaling 1,077.5 tons per day) is pumped and mixed in-line with the 30.0 tons of sewage sludge. This mixture is then coked in dual reaction coils (each 600'L x 2" DIA) at 550° F. for 1 minute total time with a maximum pressure of 1,100 p.s.i.g. The coked mixture is allowed to settle and react in the settler-reactor (40'H x 2.6' DIA) which has a residence time of slightly less than 30 minutes.

The products obtained from the settler-reactor are gas, grease and coke-water slurry. The gas represents 1.1 weight percent of the charged solids on a dry basis (0.6 tons). The gas has the following composition:

| | Mole, % |
|---|---|
| $H_2$ | 2.5 |
| $C_2$ | 0.3 |
| $C_2^=$ | 1.6 |
| $C_3$ | 1.0 |
| $C_4$ | 0.1 |
| $C_3^=$ | 0.1 |
| $CO_2$ | 94.3 |

The grease is a viscous semi-solid when cooled representing 2.6 weight percent of the charged solids (1.4 tons). The grease fraction is a complex mixture of many organic compounds and can be used as a source of fuel.

The coke-water slurry is sent to a filter where a dense non-putrescible coke is removed from the clean water. The dense coke represents 96.3 weight percent of the incoming solids on a dry basis (50.2 tons). This coke can be used as a fuel or as a mulch-fertilizer. The resulting clean water stream represents 95.5 weight percent of the total incoming mixture (1,055.3 tons). A recycle stream of 1,014 tons is separated and pumped to the garbage shredder leaving a clean water effluent stream amounting to 41.3 tons.

It will be noted that all the operations of the present process take place in a closed system. Accordingly, no pollutants are exhausted to the air, as is the case when refuse is incinerated. Similarly the water which is finally discharged is relatively low in chemical oxygen demand and can be disposed of in bodies of water without polluting the same.

The foregoing example and description clearly indicate how the present process readily affords a solution to the problem of simultaneously disposing of sewage and municipal refuse while leading to the elimination of the pollutants normally produced by the disposal of such materials.

We claim:

1. Sewage sludge and municipal refuse liquid phase coking process comprising, in combination, screening said refuse to remove large objects and grit therefrom, forming a slurry of said refuse with water of reduced biological demand derived from a subsequent coking step, said slurry comprising from 4 to 50 parts of water per part of refuse, injecting a gas into said slurry to improve the separation of heavy materials therefrom by facilitating flotation of organic particulates, mixing said slurry with said sewage sludge and coking the resulting mixture under a pressure sufficient to prevent the vaporization of water to form gases, greases, water of reduced biological demand and non-putrescible coke, all of said operations taking place in a closed system whereby no pollutants are exhausted to the air.

2. The process as defined in claim 1, wherein the slurried municipal refuse is treated in a gravity settler to remove non-combustible materials therefrom.

3. The process as defined in claim 1, wherein said sewage is municipal sewage sludge.

4. The process as defined in claim 1, wherein said gas is air or carbon dioxide.

5. The process as defined in claim 1, wherein said slurry comprises from 6 to 25 parts of water per part of refuse.

6. The process according to claim 1, wherein said sewage, after screening, is made to flow to a primary settler for removal of settleable solids and the waste water free of said solids is sent to an activated sludge chamber where an activated sludge is formed, settled and removed.

* * * * *